United States Patent
Kitabayashi

(10) Patent No.: US 9,356,417 B2
(45) Date of Patent: May 31, 2016

(54) FIBER LASER

(71) Applicant: FUJIKURA LTD., Tokyo (JP)

(72) Inventor: Tomoharu Kitabayashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/277,099

(22) Filed: May 14, 2014

(65) Prior Publication Data

US 2014/0341238 A1 Nov. 20, 2014

(30) Foreign Application Priority Data

May 16, 2013 (JP) .................................. 2013-104563

(51) Int. Cl.
*H01S 3/30* (2006.01)
*H01S 3/067* (2006.01)
*H01S 3/094* (2006.01)

(52) U.S. Cl.
CPC ............... *H01S 3/0675* (2013.01); *H01S 3/067* (2013.01); *H01S 3/06754* (2013.01); *H01S 3/094007* (2013.01)

(58) Field of Classification Search
CPC ... H01S 3/067; H01S 3/0675; H01S 3/06754; H01S 3/094007
USPC .............................................................. 372/6
See application file for complete search history.

(56) References Cited

U.S. PATENT DOCUMENTS 5,991,068 A * 11/1999 Massicott et al. ............. 359/337

FOREIGN PATENT DOCUMENTS

JP 2010-56265 A 3/2010

* cited by examiner

*Primary Examiner* — Yuanda Zhang
(74) *Attorney, Agent, or Firm* — Westerman, Hattori, Daniels & Adrian, LLP

(57) ABSTRACT

A fiber laser includes: an amplification optical fiber; a pumping light source configured to emit pumping light to pump the active element of the amplification optical fiber; a first mirror provided on one side of the amplification optical fiber; and a second mirror provided on the other side of the amplification optical fiber. When an optical loss between the first mirror and the second mirror is equal to an optical gain in the amplification optical fiber, a difference between a gain of light having a wavelength at which a gain becomes maximum and a gain of light having a wavelength reflected off the first mirror and the second mirror is 35 dB or less in the amplification optical fiber.

4 Claims, 2 Drawing Sheets

FIBER LASER

BACKGROUND OF THE INVENTION

The embodiment is directed to a fiber laser that can emit light at a desired wavelength.

As one of laser apparatuses for use in the fields of processing machines, medical devices, and measurement devices, for example, a fiber laser is known. A laser light emitted from this fiber laser is excellent in light condensation properties more than in laser lights emitted from other laser apparatuses, the laser light is of high power density, and the spot diameter can be made small. Moreover, since the fiber laser allows high-precision processing and can process a hard material that absorbs a laser light, the application is rapidly spreading in the field of processing machines specifically.

As one of the fiber laser, a resonator fiber laser is known in which a pair of mirrors is disposed as an amplification optical fiber is sandwiched between the mirrors (see JP-A-2010-56265). In the resonator fiber laser, in a pair of the mirrors, the reflectance of one mirror is higher than the reflectance of the other mirror, and the other mirror reflects light having at least a part of a wavelength in the wavelength of the light reflected off one mirror. A part of light resonating between one mirror and the other mirror is transmitted through the other mirror whose reflectance is low, and the light is emitted. Therefore, the wavelength of the outgoing light is defined by the reflected wavelength of the mirror Patent Document 1: JP-A-2010-56265

SUMMARY OF THE INVENTION

However, when a fiber laser like the resonator fiber laser descried in JP-A-2010-56265 is fabricated, the fiber laser sometimes emits light having a wavelength different from a wavelength of light reflected off the mirror. In other words, in the wave range in which an optical gain is produced in the amplification optical fiber, laser oscillation occurs at a wavelength different from a wavelength of light reflected off the mirror, and light having a wavelength different from a designed wavelength is emitted. When this laser oscillation occurs, the power of the outgoing light becomes unstable, and the efficiency of converting incident pumping light into the outgoing light is prone to deteriorate. Moreover, in the case of emitting light having a wavelength different from a designed wavelength, the light is prone to leak at an unintended portion in the apparatus, which causes the degradation of the reliability of the apparatus itself.

Thus, the present invention provides a fiber laser that can emit light at a desired wavelength.

The inventor dedicatedly investigated the causes why laser oscillation occurs at a wavelength different from the wavelength reflected off the mirror forming the resonator as described above. As a result, it was concluded that unintentional oscillation as described above occurs because of the following cause in which light having a wavelength different from the wavelength of light reflected off the mirror causes Fresnel reflection at the emission end face or the fusion spliced face of an optical fiber or causes Rayleigh scattering in an optical fiber and in which when a fiber laser is used to process an object to be processed, light is emitted from an emission end face, reflected off the surface of the object to be processed, and then incident on the emission end face, for example. Therefore, the inventor further dedicatedly investigated to conceive the present invention.

According to the present invention, there is provide a fiber laser including: an amplification optical fiber including a core doped with an active element and a cladding surrounding an outer circumferential surface of the core; a pumping light source configured to emit pumping light to pump the active element of the amplification optical fiber; a first mirror provided on one side of the amplification optical fiber and configured to reflect light having at least a part of a wavelength of light emitted from the active element pumped by the pumping light; and a second mirror provided on the other side of the amplification optical fiber and configured to reflect light having at least a part of the wavelength of the light reflected off the first mirror at a reflectance lower than in the first mirror, wherein a gain of light having a wavelength longer than the wavelength of the light reflected off the first mirror and the second mirror is a gain of 35 dB or less in the amplification optical fiber.

In the fiber laser according to the present invention, a resonator is formed of the amplification optical fiber, the first mirror, and the second mirror. In the resonator in this configuration, since light having a wavelength different from the wavelength of the light reflected off the first mirror and the second mirror is not reflected off at least one of the first mirror and the second mirror, a loss between the first mirror and the second mirror is great and the loss is generally greater than an attenuation of 35 dB. On the other hand, since the light reflected off the first mirror and the second mirror is reflected off the first mirror and the second mirror, the light is hardly emitted from the resonator, and the loss between the first mirror and the second mirror becomes small. It is noted that the optical loss referred here includes all losses such as transmission losses caused by light transmitted and emitted from the first mirror and the second mirror when the light bounces back and forth between the first mirror and the second mirror and caused by the optical fiber, splicing losses at both ends of the amplification optical fiber, losses caused by unintendedly leaked light, and losses caused by light converted into heat.

When pumping light is incident on the amplification optical fiber, the profile expressing the gain of the amplification optical fiber is shifted to the short wavelength side as the gain is increased. However, in the fiber laser according to the present invention, the gain of the light having a wavelength longer than the wavelength of the light reflected off the first mirror and the second mirror is a gain of 35 dB or less in the amplification optical fiber as described above, so that the loss is greater than the gain, and it is prevented that the loss is matched with the gain between the first mirror and the second mirror for light having a wavelength longer than the wavelength of the light reflected off the first mirror and the second mirror. On the other hand, the light reflected off the first mirror and the second mirror tends to oscillate because the losses are small in the resonator as described above. Therefore, the gain of the light reflected off the first mirror and the second mirror may be a gain of 35 dB or less in the amplification optical fiber, or may be greater than a gain of 35 dB. The foregoing profile is then shifted to the short wavelength side, and the gain of the light reflected off the first mirror and the second mirror reaches a predetermined value. At this point, the optical loss is matched with the optical gain between the first mirror and the second mirror, the light is preferentially oscillated, and the foregoing profile is clipped in a certain shape. Moreover, when the resonance of the light reflected off the first mirror and the second mirror preferentially occurs, the pumping energy of the active element in the pumped state is preferentially consumed by stimulated emission due to the light resonating between the first mirror and the second mirror, so that stimulated emission caused by light in Rayleigh scattering or light reflected off the optical fiber end face, for example, is suppressed. Thus, it is possible to further reduce oscillation caused by Rayleigh scattering or reflection on the optical fiber end face.

Accordingly, in accordance with the fiber laser according to the present invention, the light reflected off the first mirror and the second mirror is preferentially oscillated, so that it is possible to emit light having a desired wavelength.

Further, in accordance with the fiber laser, it is preferable that a gain of light having a wavelength shorter than the wavelength of the light reflected off the first mirror and the second mirror is a gain of 35 dB or less in the amplification optical fiber.

With the configuration as described above, the gain of the light having a wavelength different from the wavelength of the light reflected off the first mirror and the second mirror is a gain of 35 dB or less in the amplification optical fiber. According to the fiber laser in this configuration, it is possible to prevent the oscillation of light having a wavelength different from the wavelength of the light reflected off the first mirror and the second mirror in the resonator, and it is possible to prevent that the wavelength of the outgoing light is changed to another wavelength even after emitting light having a desired wavelength. For example, in the previously existing fiber laser, oscillation sometimes occurs in the resonator in processing an object to be processed because light emitted from the emission end face of the fiber laser is reflected off the surface of the object to be processed and again incident on the emission end face. However, in accordance with the fiber laser according to the present invention, it is prevented to oscillate light having a wavelength longer than the wavelength of the light reflected off the first mirror and the second mirror and to oscillate light having a wavelength on the short wavelength side, so that it is possible to prevent the oscillation of light having a wavelength other than a desired wavelength even in the case where light reflected off an object to be processed is incident on the fiber laser.

Further, it is preferable that when an optical loss is equal to an optical gain between the first mirror and the second mirror, a wavelength at which a gain becomes maximum is equal to the wavelength of the light reflected off the first mirror and the second mirror for resonating in the amplification optical fiber.

With this configuration, it is possible to more preferentially produce the optical resonance caused by the light that bounces back and forth between the first mirror and the second mirror, and it is possible to more appropriately emit light having a desired wavelength. Moreover, it is possible to amplify the light resonating between the first mirror and the second mirror at the maximum gain.

As described above, according to the present invention, there is provided a fiber laser that can emit light at a desired wavelength.

DETAILED DESCRIPTION OF THE INVENTION

In the following, a preferable embodiment of a fiber laser according to an embodiment of the present invention will be described in detail with reference to the drawings.

Figure 1:
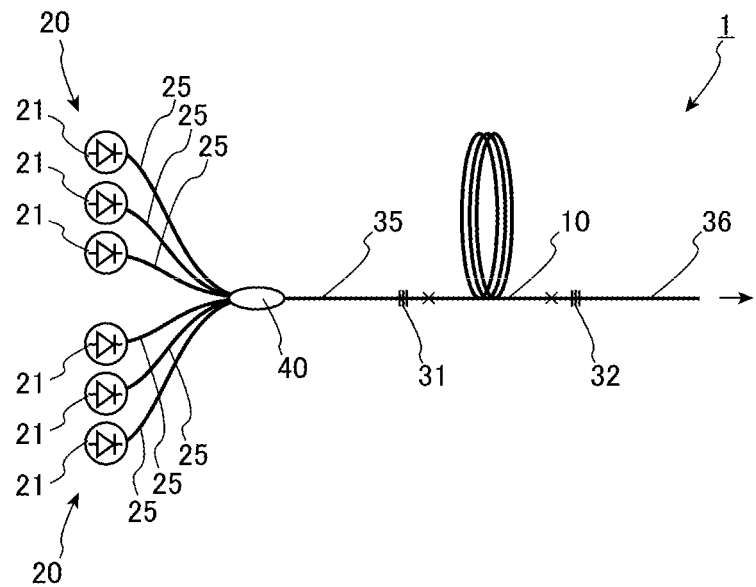
FIG. 1 is a diagram of a fiber laser according to an embodiment of the present invention.

FIG. 1 is a diagram of a fiber laser according to an embodiment of the present invention. As illustrated in FIG. 1, a fiber laser 1 according to the embodiment includes a main configuration of an amplification optical fiber 10, a pumping light source 20, a light combiner 40, an optical fiber 35 connected to one side of the amplification optical fiber 10, a first FBG 31 provided on the optical fiber 35, an optical fiber 36 connected to the other side of the amplification optical fiber 10, and a second FBG 32 provided on the optical fiber 36. The amplification optical fiber 10, the first FBG 31, and the second FBG 32 form a resonator.

The pumping light source 20 is configured of a plurality of laser diodes 21. In the embodiment, the laser diode 21 is a Fabry-Perot semiconductor laser having a GaAs semiconductor material, for example, and emits pumping light at a center wavelength of 915 nm. Moreover, the laser diodes 21 of the pumping light source 20 are connected to the optical fiber 25, and pumping light emitted from the laser diodes 21 propagates through the optical fiber 25 as multimode light, for example.

Figure 2:
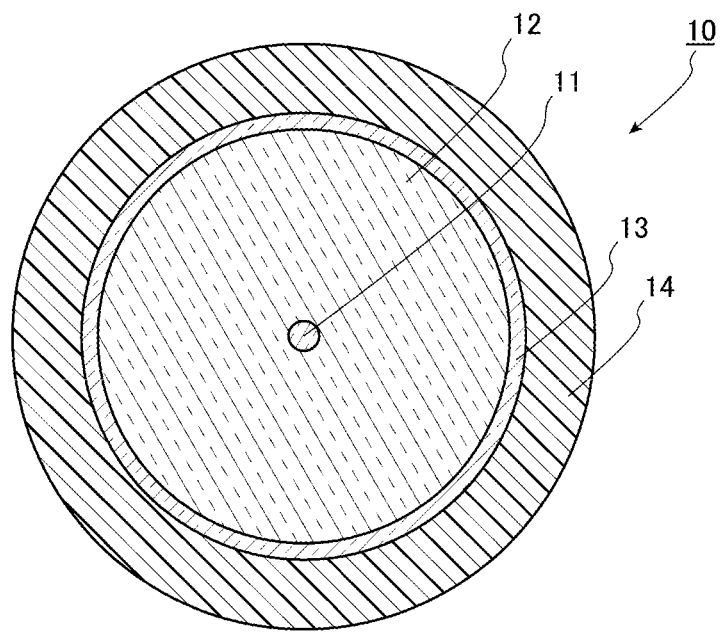
FIG. 2 is a cross sectional view of the cross sectional structure of an amplification optical fiber illustrated in FIG. 1.

FIG. 2 is a cross sectional view of the cross sectional structure of the amplification optical fiber 10 illustrated in FIG. 1. As illustrated in FIG. 2, the amplification optical fiber 10 includes a main configuration of a core 11, an inner cladding 12 surrounding the outer circumferential surface of the core 11 with no gap, an outer cladding 13 encapsulating the outer circumferential surface of the inner cladding 12, and a buffer layer 14 encapsulating the outer cladding 13 in a so-called double cladding structure. The refractive index of the inner cladding 12 is lower than the refractive index of the core 11, and the refractive index of the outer cladding 13 is lower than the refractive index of the inner cladding 12. For materials forming this core 11, silica is named which is doped with an element such as germanium (Ge) to increase the refractive index and an active element such as Yb pumped by pumping light emitted from the pumping light source 20, for example. For this active element, rare earth elements are named. For rare earth elements, thulium (Tm), cerium (Ce), neodymium (Nd), europium (Eu), and erbium (Er), for example, are named in addition to Yb described above. Moreover, for the active element, bismuth (Bi), for example, can be named in addition to rare earth elements. Furthermore, for materials forming the inner cladding 12, pure silica with no dopant can be named, for example. It is noted that an element such as fluorine (F) to reduce the refractive index may be doped to a material forming the inner cladding 12. Furthermore, for a material forming the outer cladding 13, a resin or silica is named. For example, an ultraviolet curing resin is named for a resin, and silica doped with an element such as fluorine (F) to reduce the refractive index lower than the refractive index of the inner cladding 12 is named for silica. In addition, for a material forming the buffer layer 14, an ultraviolet curing resin is named, for example. In the case where the outer cladding 13 is a resin, the material is an ultraviolet curing resin different from a resin forming the outer cladding.

Moreover, the amplification optical fiber 10 is formed to have a gain of 35 dB or less. Therefore, the gains of light having a wavelength longer than the wavelength of light reflected off the first FBG 31 and the second FBG 32, described later, light having a wavelength shorter than the wavelength of light reflected off the first FBG 31 and the second FBG 32, and light reflected off the first FBG 31 and the second FBG 32 are a gain of 35 dB or less. In order to set the gain of the amplification optical fiber 10 as described above, it may be fine that the absorption index (the ratio of absorbing pumping light per unit length to incident pumping light) or the length of the pumping light of the amplification optical fiber 10 is appropriately set, for example. Moreover, it is also effective to reduce losses in the wavelength of light reflected off the first FBG 31 and the second FBG 32 in the resonator. In this case, since the gain necessary for oscillation can be suppressed low, it is also possible to suppress an optical gain to be low at a wavelength at which amplification is not intended in the amplification optical fiber 10.

The optical fiber 35 connected to one side of the amplification optical fiber 10 includes a main configuration of a core doped with no active element, an inner cladding surrounding the outer circumferential surface of this core with no gap, an outer cladding encapsulating the outer circumferential surface of the inner cladding, and a buffer layer encapsulating the outer cladding, which is in the configuration almost similar to the amplification optical fiber 10 except that the core is doped with no active element. The core of the optical fiber 35 is connected to the core 11 of the amplification optical fiber 10, and the inner cladding of the optical fiber 35 is connected to the inner cladding 12 of the amplification optical fiber 10. Moreover, the core of the optical fiber 35 is provided with the first FBG 31 as a first mirror. Thus, the first FBG 31 is provided on one side of the amplification optical fiber 10. The first FBG 31 is configured in which the first FBG 31 is repeatedly and periodically provided with a portion having a high refractive index along the longitudinal direction of the optical fiber 35 and the period is adjusted to reflect light having at least a part of the wavelength of light emitted from the active element of the amplification optical fiber 10 in the pumped state. The reflectance of the first FBG 31 is higher than the reflectance of the second FBG 32, described later, in which the first FBG 31 preferably reflects light having a desired wavelength at a reflectance of 90% or more in light emitted from the active element and more preferably reflects the light at a reflectance of 99% or more. Furthermore, the wavelength of the light reflected off the first FBG 31 is a wavelength of 1,090 nm, for example, in the case where the active element is ytterbium as described above.

The optical fiber 36 connected to the other side of the amplification optical fiber 10 includes a main configuration of a core doped with no active element, a cladding surrounding the outer circumferential surface of this core with no gap, and a buffer layer encapsulating the outer circumferential surface of this cladding. The core of the optical fiber 36 is connected to the core 11 of the amplification optical fiber 10, and the cladding of the optical fiber 36 is connected to the inner cladding 12 of the amplification optical fiber 10. Moreover, the core of the optical fiber 36 is provided with the second FBG 32 as a second mirror. Thus, the second FBG 32 is provided on the other side of the amplification optical fiber 10. The second FBG 32 is configured in which the second FBG 32 is repeatedly provided with a portion having a high refractive index at constant periods along the longitudinal direction of the optical fiber 36 and is configured to reflect light having at least a part of the wavelength of the light reflected off the first FBG 31 at a reflectance lower than in the first mirror. The second FBG 32 preferably reflects light having at least a part of the wavelength of the light reflected off the first FBG 31 at a reflectance of 5 to 50%, and more preferably reflects the light at a reflectance of 5 to 10%. Furthermore, the end portion of the optical fiber 36 opposite to the end portion connected to the amplification optical fiber 10 is a free end with no connection.

In the light combiner 40, the cores of the optical fibers 25 are connected to the inner cladding of the optical fiber 35. Therefore, the optical fibers 25, through which pumping light emitted from the laser diodes 21 propagates, are optically joined to the inner cladding 12 of the amplification optical fiber 10 through the inner cladding of the optical fiber 35.

In the fiber laser 1 as described above, when pumping light is individually emitted from the laser diodes 21 of the pumping light source 20, the pumping light is incident on the inner cladding 12 of the amplification optical fiber 10 through the inner cladding of the optical fiber 35. The pumping light incident on the inner cladding 12 mainly propagates through the inner cladding 12, and pumps the active element doped in the core 11 when passing through the core 11. The active element in the pumped state emits spontaneous emission light having a specific wavelength. The spontaneous emission light at this time is light having a specific waveband including a wavelength of 1,090 nm in the case where the active element is ytterbium, for example. The spontaneous emission light propagates through the core 11 of the amplification optical fiber 10. Light having a part of the wavelength of the spontaneous emission light is reflected off the first FBG 31. Among the light reflected off the first FBG 31, light having a wavelength that the second FBG 32 reflects is reflected off the second FBG 32 and bounces back and forth in the resonator. When the light reflect off the first FBG 31 and the second FBG 32 propagates through the core 11 of the amplification optical fiber 10, stimulated emission is caused to amplify the light, and the light is in the laser oscillation state when the gain is equal to the loss in the resonator. A part of the light resonating between the first FBG 31 and the second FBG 32 is then transmitted through the second FBG 32, and emitted from the end portion of the optical fiber 36.

It is noted that since the light having a wavelength longer than the wavelength of the light reflect off the first FBG 31 and the second FBG 32 and the light having a wavelength shorter than the wavelength of the light reflect off the first FBG 31 and the second FBG 32 are transmitted through at least one of the first FBG 31 and the second FBG 32, the loss of the light is great in the resonator, and the loss is generally greater than an attenuation of 35 dB. On the other hand, since it is difficult to emit the light reflected off the first FBG 31 and the second FBG 32 out of the resonator, the loss of the light reflected off the first FBG 31 and the second FBG 32 is an attenuation of 35 dB or less in the resonator, which is an attenuation of 3 to 35 dB, for example.

Next, the relationship between the gain and the wavelength in the amplification optical fiber 10 and the wavelength of light reflected off the first FBG 31 and the second FBG 32 will be described.

Figure 3:
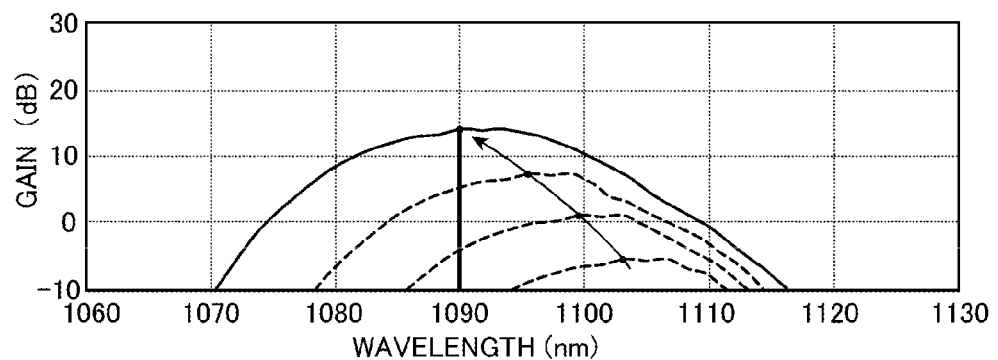
FIG. 3 is a diagram of an exemplary relationship between the optical wavelength and the optical gain in the amplification optical fiber.
Figure 4:
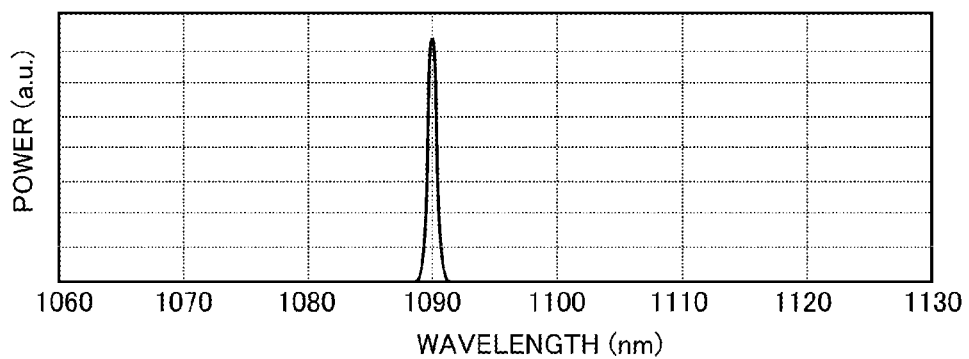
FIG. 4 is a diagram of the relationship between the wavelength and power of light emitted from the fiber laser in the case of the example illustrated in FIG. 3.

FIG. 3 is a diagram of an exemplary relationship between the optical wavelength and the optical gain in the amplification optical fiber 10. More specifically, FIG. 3 is a diagram of the relationship between the optical wavelength and the optical gain in the amplification optical fiber 10 in the case where ytterbium is used for the active element doped in the amplification optical fiber 10, the first FBG 31 is used which reflects light having a wavelength of 1,090 nm at a reflectance of 100%, and the second FBG 32 is used which reflects light having a wavelength of 1,090 nm at a reflectance of 10%. Moreover, FIG. 4 is a diagram of the relationship between the wavelength and power of light emitted from the fiber laser 1 in the case of the example illustrated in FIG. 3.

First, in the stage immediately after pumping light starts to come into the amplification optical fiber 10, the pumped state of the active element is low, and the optical gain is small in the amplification optical fiber 10 as depicted by broken lines in FIG. 3. The pumped state of the active element of the amplification optical fiber 10 is gradually increased with a lapse of time, and the optical gain is increased in the amplification optical fiber 10. At this time, as illustrated by an arrow in FIG. 3, as the optical gain is increased in the amplification optical fiber 10, the peak of the gain is gradually shifted to the short wavelength side. However, in the fiber laser 1 according to the embodiment, the gain of the amplification optical fiber 10 is a gain of 35 dB or less, and the loss of the light having a wavelength different from the wavelength of the light reflected off the first FBG 31 and the second FBG 32 is greater than an attenuation of 35 dB in the resonator, so that it is prevented to oscillate the light having a wavelength longer than the wavelength of the light reflected off the first FBG 31 and the second FBG 32. It is difficult to attenuate the light reflected off the first FBG 31 and the second FBG 32 as described above in the resonator, so that the loss and the gain tend to be in balance even though the gain of the amplification optical fiber 10 is a gain of 35 dB or less. As described above, when the optical gain is equal to the optical loss between the first FBG 31 and the second FBG 32, the profile of the optical gain is clipped to be a profile depicted by a solid line in FIG. 3, for example. It is noted that the light attenuated between the first FBG 31 and the second FBG 32 includes all kinds of light such as light transmitted and emitted from the second FBG 32, light in transmission losses in the fiber, light in splicing losses at both ends of the amplification optical fiber, unintendedly leaked light, and light converted into heat.

Moreover, in the example illustrated in FIG. 3, the wavelength having the greatest gain in the amplification optical fiber 10 (the maximum gain wavelength) is 1,090 nm when the profile of the optical gain is clipped, which is equal to the reflected wavelengths of the first FBG 31 and the second FBG 32. In other words, in the fiber laser 1 according to the embodiment, the maximum gain wavelength is equal to the wavelength of the light resonating between the first FBG 31 and the second FBG 32 (the resonant wavelength). As described above, the maximum gain wavelength is equal to the resonant wavelength, and the light resonating between the first FBG 31 and the second FBG 32 is amplified at the greatest gain.

At this time, the loss at the resonant wavelength is an attenuation of about 15 dB in the case where the reflectance of the first FBG 31 is 100% (the loss is zero), the reflectance of the second FBG 32 is 10% (the loss is an attenuation of 10 dB), and the other loss of the optical fiber is an attenuation of about 5 dB including transmission losses, splicing losses, and so on, and the gain at the resonant wavelength is a gain of about 15 dB as well.

In the fiber laser, light is sometimes reflected due to various factors as described above. However, since the light other than light caused by the reflected wavelengths of the first FBG 31 and the second FBG 32 is not reflected off the first FBG 31, only unintended reflection such as Rayleigh scattering occurs, and the loss is an attenuation of about 30 to 40 dB. Moreover, the light other than light caused by the reflected wavelengths of the first FBG 31 and the second FBG 32 is not reflected off the second FBG 32 as well. However, as described above, there is sometimes the case where light is reflected off an object to be processed, and again incident on the emission end of the fiber laser 1, for example. In this case, light is sometimes incident on the resonator at a reflectance of about 100% at the maximum, and the loss is zero in this case.

When losses such as transmission losses and splicing losses of the optical fiber are taken into consideration in this case, the loss of the light other than light caused by the reflected wavelengths of the first FBG 31 and the second FBG 32 is greater than an attenuation of 35 dB, which is an attenuation of about 45 dB or less. The light other than light caused by the reflected wavelengths of the first FBG 31 and the second FBG 32 is oscillated as well when the light has a gain equivalent to the attenuation. However, the gain of the amplification optical fiber 10 is a gain of 35 dB or less as described above, so that it is prevented to oscillate the light other than light caused by the reflected wavelengths of the first FBG 31 and the second FBG 32.

Furthermore, when the resonant wavelength is the maximum gain wavelength as described above in clipping the profile of the optical gain as in the fiber laser 1 according to the embodiment, the gain of the light other than light caused by the reflected wavelengths of the first FBG 31 and the second FBG 32 is surely smaller than the gain of the light resonating between the first FBG 31 and the second FBG 32. Therefore, the light is caused to preferentially resonate due to the reflection in the first FBG 31 and the second FBG 32, and it is possible to suppress oscillation caused by light reflected off an object to be processed, for example. In addition to this, the pumping energy of the active element in the pumped state is preferentially consumed by the stimulated emission of the light resonating between the first FBG 31 and the second FBG 32, so that the stimulated emission of the light having a wavelength different from the wavelength of the resonating light is suppressed, and it is further suppressed to oscillate the light having a wavelength different from the wavelength of the resonating light. Thus, as illustrated in FIG. 4, the light having a wavelength of 1,090 nm, which is a resonant wavelength (which is matched with the reflected wavelengths of the first FBG 31 and the second FBG 32 in the embodiment) is emitted from the fiber laser 1. Since the emitted light is not light oscillated due to light reflected in Rayleigh scattering and light reflected off the optical fiber end face, for example, the power is stable.

As described above, in accordance with the fiber laser according to the embodiment, it is possible to suppress oscillation due to reflection in Rayleigh scattering and reflection at the fiber end face, so that it is possible to emit light having a desired wavelength and resonating between the first FBG 31 and the second FBG 32.

As described above, the present invention is described as the embodiment is taken as an example. However, the configuration of the fiber laser according to the embodiment of the present invention can be appropriately modified, not limited to the foregoing embodiment.

Figure 5:
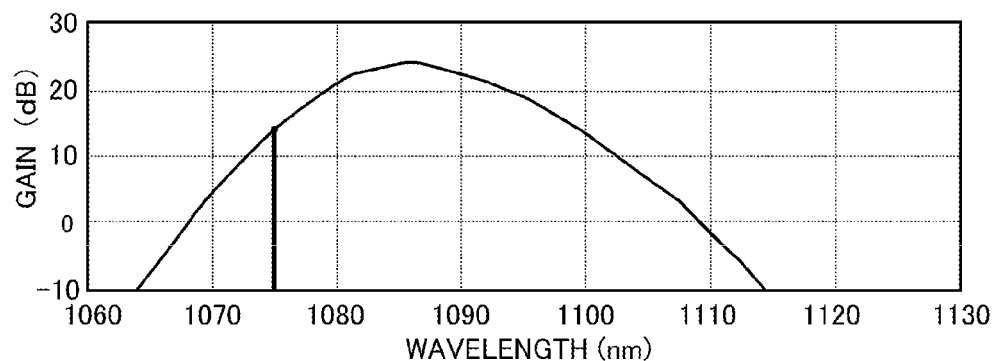
FIG. 5 is a diagram of an exemplary relationship between the optical wavelength and the optical gain in the amplification optical fiber in the case where the reflected wavelengths of a first FBG and a second FBG are at a wavelength of 1,075 nm.

For example, the oscillation caused by light reflected in Rayleigh scattering or light reflected off the optical fiber end face can be most effectively suppressed in the case where the maximum gain wavelength is equal to the resonant wavelength as in the foregoing fiber laser 1 according to the embodiment. However, the embodiment of the present invention is not limited thereto, which can suppress oscillation even though the maximum gain wavelength is different from the resonant wavelength. In the example illustrated in FIG. 3, the reflected wavelengths of the first FBG 31 and the second FBG 32 are a wavelength of 1,090 nm. However, the reflected wavelengths of the first FBG 31 and the second FBG 32 may be other than a wavelength of 1,090 nm. FIG. 5 is the case where the reflected wavelengths of the first FBG 31 and the second FBG 32 are a wavelength of 1,075 nm in the configuration the same as in FIG. 3. As described above, the loss is greater than an attenuation of 35 dB and the loss is generally an attenuation of 45 dB or less at wavelengths other than the reflected wavelengths of the first FBG 31 and the second FBG 32. As illustrated in FIG. 5, the gain is a gain of about 23 dB even at the maximum gain wavelength. Oscillation preferentially occurs at the reflected wavelengths of the first FBG 31 and the second FBG 32, and oscillation caused by reflection, for example, at wavelengths other than the reflected wavelengths of the first FBG 31 and the second FBG 32 is suppressed. Therefore, even in the case where the maximum gain wavelength is different from the resonant wavelength and the wavelength of the light caused by reflection, for example, is matched with the maximum gain wavelength, resonance caused by the first mirror and the second mirror preferentially occurs, not oscillation caused by reflection, for example, and it is possible to suppress oscillation caused by light in Rayleigh scattering or light reflected off the optical fiber end face.

Moreover, in the foregoing embodiment, the first FBG 31 and the second FBG 32 are used as the first mirror and the second mirror. However, FBGs are not necessarily used for the first mirror and the second mirror. For example, a reflection film made of an oxide may be used.

Furthermore, in the fiber laser according to an embodiment of the present invention, the optical fiber 35 according to the foregoing embodiment is not a necessary configuration. In the case where the optical fiber 35 is omitted, it may be fine that the inner cladding 12 of the amplification optical fiber 10 is connected to the optical fiber 35 in the light combiner 40 and the first FBG 31 is provided on one side of the amplification optical fiber 10. In addition, in the fiber laser according to the embodiment of the present invention, the optical fiber 36 is not a necessary configuration. In the case where the optical fiber 36 is omitted, it may be fine that the second FBG 32 is provided on the other side of the amplification optical fiber 10.

In accordance with the fiber laser according to the embodiment of the present invention 1, light having a desired wavelength can be emitted, and the fiber laser can be applied to industries such as the processing fields and medical fields.

The invention claimed is:

1. A fiber laser comprising:
an amplification optical fiber including a core doped with an active element and a cladding surrounding an outer circumferential surface of the core;
a pumping light source configured to emit pumping light to pump the active element of the amplification optical fiber;
a first mirror provided on one side of the amplification optical fiber and configured to reflect light having at least a part of a wavelength of light emitted from the active element pumped by the pumping light; and
a second mirror provided on the other side of the amplification optical fiber and configured to reflect light having at least a part of the wavelength of the light reflected off the first mirror at a reflectance lower than in the first mirror,
wherein a gain of light in all wavelength range longer than the wavelength of the light reflected off the first mirror and the second mirror is a gain of 35 dB or less in the amplification optical fiber.

2. The fiber laser according to claim 1, wherein a gain of light having a wavelength shorter than the wavelength of the light reflected off the first mirror and the second mirror is a gain of 35 dB or less in the amplification optical fiber.

3. The fiber laser according to claim 1, wherein when an optical loss is equal to an optical gain between the first mirror and the second mirror, a wavelength at which a gain becomes maximum is equal to the wavelength of the light reflected off the first mirror and the second mirror for resonating in the amplification optical fiber.

4. The fiber laser according to claim 2, wherein when an optical loss is equal to an optical gain between the first mirror and the second mirror, a wavelength at which a gain becomes maximum is equal to the wavelength of the light reflected off the first mirror and the second mirror for resonating in the amplification optical fiber.

* * * * *